US009682698B2

(12) United States Patent
Aoki et al.

(10) Patent No.: US 9,682,698 B2
(45) Date of Patent: Jun. 20, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Kazuma Aoki, Nisshin (JP); Koji Hokoi, Toyota (JP); Takanori Aoki, Nisshin (JP); Makoto Hirai, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/139,507

(22) Filed: Apr. 27, 2016

(65) Prior Publication Data

US 2016/0318505 A1 Nov. 3, 2016

(30) Foreign Application Priority Data

Apr. 30, 2015 (JP) ................. 2015-092829

(51) Int. Cl.
*B60W 20/20* (2016.01)
*B60W 10/06* (2006.01)
(Continued)

(52) U.S. Cl.
CPC ............... *B60W 20/20* (2013.01); *B60K 6/26* (2013.01); *B60K 6/365* (2013.01); *B60K 6/40* (2013.01); *B60K 6/445* (2013.01); *B60W 10/06* (2013.01); *B60W 10/08* (2013.01); *B60W 20/40* (2013.01); *B60W 50/14* (2013.01); *B60K 2006/268* (2013.01); *B60W 2710/06* (2013.01);
(Continued)

(58) Field of Classification Search
CPC ...... B60W 20/20; B60W 10/06; B60W 10/08; B60W 20/40; B60W 50/14; B60W 2710/08; B60W 2710/06; B60K 6/445; B60K 6/365; B60K 6/40; B60K 6/26; B60K 2006/268; Y10S 903/93; Y10S 903/911; Y10S 903/951; Y10S 903/906; B60Y 2200/92; B60Y 2300/182
See application file for complete search history.

(56) References Cited

U.S. PATENT DOCUMENTS

| 2009/0171522 | A1* | 7/2009 | Luo | B60K 6/405 |
| | | | | 701/22 |
| 2010/0162686 | A1* | 7/2010 | Miyashita | B60K 6/24 |
| | | | | 60/274 |

(Continued)

FOREIGN PATENT DOCUMENTS

JP 2013-189047 A 9/2013

*Primary Examiner* — Rodney Butler
(74) *Attorney, Agent, or Firm* — Andrews Kurth Kenyon LLP

(57) ABSTRACT

A control system for hybrid vehicles that prevents an occurrence of shock resulting from manually shifting an operating mode is provided. The control system is configured to switch an operating mode between HV mode in which the vehicle is powered mainly by the engine and EV mode in which the vehicle is powered mainly by said motor in response to a manual switching operation. The control system delays a startup of the engine until satisfaction of a predetermined running condition, if the manual switching operation is executed to shift from the EV mode to the HV mode under a condition that the running condition falls within a region where both of the HV mode and the EV mode are selectable.

8 Claims, 6 Drawing Sheets

(51) Int. Cl.
*B60W 10/08* (2006.01)
*B60K 6/40* (2007.10)
*B60W 20/40* (2016.01)
*B60K 6/445* (2007.10)
*B60K 6/365* (2007.10)
*B60K 6/26* (2007.10)
*B60W 50/14* (2012.01)

(52) U.S. Cl.
CPC ...... *B60W 2710/08* (2013.01); *B60Y 2200/92* (2013.01); *B60Y 2300/182* (2013.01); *Y10S 903/906* (2013.01); *Y10S 903/911* (2013.01); *Y10S 903/93* (2013.01); *Y10S 903/951* (2013.01)

(56) References Cited

U.S. PATENT DOCUMENTS

| | | | | |
|---|---|---|---|---|
| 2013/0297136 | A1* | 11/2013 | Yamanaka | B60K 6/48 701/22 |
| 2014/0144998 | A1* | 5/2014 | Ichishi | B60H 1/00314 237/12.3 A |
| 2015/0166051 | A1* | 6/2015 | Yoon | B60W 20/40 477/5 |
| 2015/0197162 | A1* | 7/2015 | Martin | B60L 11/1861 701/22 |
| 2015/0291149 | A1* | 10/2015 | Kitabatake | B60K 6/445 701/22 |
| 2016/0244050 | A1* | 8/2016 | Ouchi | B60K 6/48 |

* cited by examiner

CONTROL SYSTEM FOR HYBRID VEHICLE

The present invention claims the benefit of Japanese Patent Application No. 2015-092829 filed on Apr. 30, 2015 with the Japanese Patent Office, the disclosures of which are incorporated herein by reference in its entirety.

BACKGROUND

Field of the Invention

Embodiments of the present application relates to the art of a control system for a hybrid vehicle in which a prime mover includes an engine and a motor, and especially to a control system for a hybrid vehicle to shift an operating mode between an engine mode and a motor mode.

Discussion of the Related Art

JP-A-2013-189047 describes a control system for a hybrid vehicle having an engine and two motors. In the hybrid vehicle taught by JP-A-2013-189047, an operating mode can be selected from hybrid mode (to be abbreviated as "HV mode" hereinafter) in which the hybrid vehicle is powered by the engine, single-motor mode in which the hybrid vehicle is powered by any one of the motors, and dual-motor mode in which the hybrid vehicle is powered by both of the motors. According to the teachings of JP-A-2013-189047, when the operating mode is shifted from the single-motor mode or the dual-motor mode to the HV mode, the engine is started by any one of the motors. However, if the motor generating power for propelling the vehicle is used to start the engine, shocks may be caused by a reduction in driving force when shifting the operating mode from the dual-motor mode to the HV mode. In order to prevent such reduction in driving force, the control system taught by JP-A-2013-189047 is configured to switch the operating mode at a timing when a required driving force is decreased to a level possible to propel the vehicle by only one of the motors even if the other motor is used to carry out a cranking of the vehicle.

That is, the operating mode of the hybrid vehicle taught by JP-A-2013-189047 can be selected from the mode in which the vehicle is powered mainly by the engine to ensure comparatively great driving force, and the mode in which the vehicle is powered mainly by electric power(s) of the motor(s). According to the teachings of JP-A-2013-189047, selection of the operating mode is made based on a required driving force and a state of charge of a battery. However, in a hybrid vehicle provided with a mode selecting switch, the operating mode can be switched manually. In this case, if a switching operation to the HV mode is executed under conditions that the state of charge of the battery is low and that the required driving force is large, the above-explained reduction in the driving force may be caused by starting the engine using the motor generating the driving force. In addition, a reaction force to start the engine is applied to driving wheels. Consequently, reduction in acceleration and shocks would be caused.

SUMMARY

Aspects of embodiments of the present invention have been conceived noting the foregoing technical problems, and it is therefore an object of embodiments of the present invention is to provide a control system for hybrid vehicles configured to prevent occurrence of shock when shifting the operating mode manually.

The control system is applied to a hybrid vehicle having an engine and at least one motor adapted not only to generate a driving force but also to start the engine, and the control system is provided with a controller that starts the engine by the motor upon satisfaction of a predetermined running condition of the vehicle governed at least by a required driving force. In order to achieve the above-explained objective, according to the preferred embodiment of the present application, the controller is configured to switch an operating mode of the vehicle between HV mode in which the vehicle is powered mainly by the engine and EV mode in which the vehicle is powered mainly by said motor in response to a manual switching operation, and to delay a startup of the engine until satisfaction of said predetermined running condition, if the manual switching operation is executed to shift from the EV mode to the HV mode under a condition that the running condition falls within a region where both of the HV mode and the EV mode are selectable.

In a non-limiting embodiment, the control system may further comprises a notifying device that notify a driver of the current operating mode. In addition, the controller may be further configured to send a command to the notifying device to indicate the HV mode as the current operating mode in response to an execution of the manual switching operation from the EV mode to the HV mode.

In a non-limiting embodiment, the controller may be further configured to execute the startup of the engine upon satisfaction of another condition to start the engine other than the running condition, while the manual switching operation from the EV mode to the HV mode is executed but the startup of the engine is being delayed.

In a non-limiting embodiment, the controller may be further configured to switch a control mode of the vehicle between a fuel saving mode in which the EV mode is selected on a priority basis and an electricity saving mode in which the HV mode is selected on a priority basis, in response to a manual switching operation. In addition, the manual switching operation may include a manual operation to shift the control mode from the fuel saving mode to the electricity saving mode under a condition that the running condition falls within a region where the EV mode is selected under the fuel saving mode and the HV mode is selected under the electricity saving mode.

In a non-limiting embodiment, the hybrid vehicle may comprise: a first motor connected to the engine; a second motor connected to driving wheels; a power distribution device adapted to perform a differential action among a first rotary element connected to the engine, a second rotary element connected to the first motor, and a third rotary element connected to the driving wheels; and a brake device that selectively halts rotation of the first rotary element. In addition, the EV mode includes: a single-motor mode in which the vehicle is powered by the second motor; and a dual-motor mode in which the vehicle is powered by both of the first motor and the second motor while halting a rotation of the first rotary element by the brake device.

In a non-limiting embodiment, the predetermined running condition may include a fact that the required driving force is reduced to be smaller than the driving force calculated by subtracting a reduction in the driving force resulting from starting the engine from a maximum output power of the second motor-generator under the EV mode.

Thus, according to the preferred embodiment of the present application, the control system is configured to delay the startup of the engine until satisfaction of the predetermined running condition, if the manual switching operation is executed to shift from the EV mode to the HV mode under a condition that the running condition falls within a region where both of the HV mode and the EV mode are selectable.

According to the preferred embodiment, therefore, reduction in the driving force resulting from starting the engine can be prevented. For this reason, shocks resulting from shifting the operating mode can be reduced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 5:
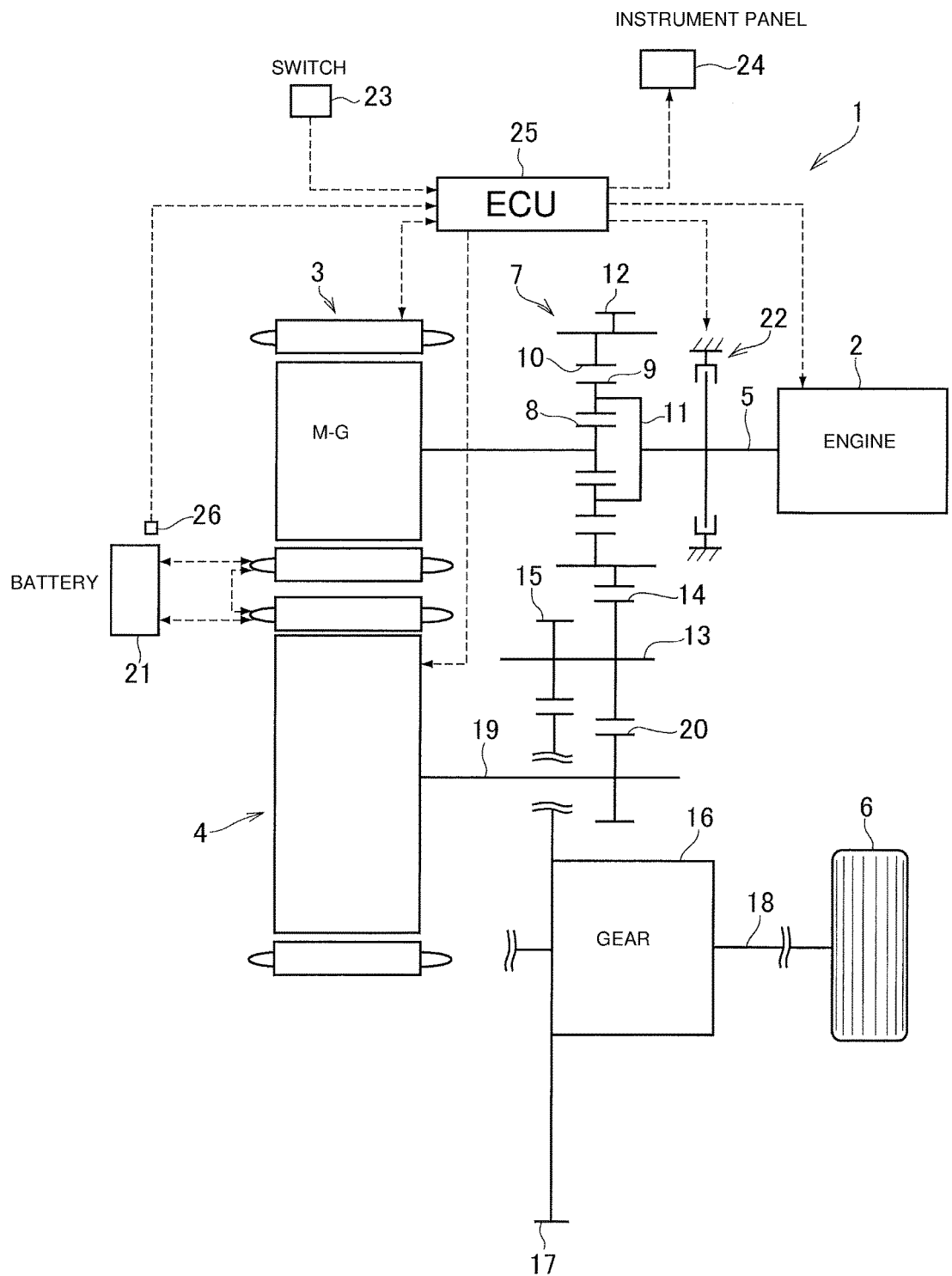
FIG. 5 is a skeleton diagram showing one example of a structure of the hybrid vehicle to which the control system according to the preferred embodiment is applied.

Preferred embodiments of the present application will now be explained with reference to the accompanying drawings. Referring now to FIG. 5, there is shown one example of the hybrid vehicle to which the control system according to the present application is applied. In the vehicle 1, a prime mover includes an engine 2, a first motor-generator 3, and a second motor-generator 4. An output shaft 5 of the engine 2 is connected to a power distribution device 7 so that power of the engine 2 is distributed to the first motor-generator 3 and to driving wheels 6. For example, a conventional single-pinion planetary gear unit may be used as the power distribution device 7. The power distribution device 7 comprises a sun gear 8, a ring gear 10 arranged concentrically with the sun gear 8, pinion gears 9 interposed between the sun gear 8 and the ring gear 10 while being meshed with those gears, and a carrier 11 supporting the pinion gears 9 while allowing to rotate and revolve around the sun gear 8.

The carrier 11 as a first rotary element is connected to the output shaft 5 of the engine 2, the sun gear 8 as a second rotary element is connected to the first motor-generator 3, and the ring gear 10 as a third rotary element is integrated with a drive gear 12 as an external gear. A driven gear 14 is fitted onto one end of a counter shaft 13 extending parallel to the output shaft 5 of the engine 2 while being meshed with the drive gear 12, and a counter driven gear 15 is fitted onto the other end of the counter shaft 13 while being meshed with a ring gear 17 of a differential gear unit 16 adapted to distribute torque to both of the driving wheels 6. That is, the ring gear 10 is connected to the driving wheels 6 through the gears 12, 14, 15, 16, and 17.

When the hybrid vehicle 1 is powered mainly by the engine 2, the first motor-generator 3 establishes a reaction torque. In this situation, in the power distribution device 7, the carrier 11 serves as an input element, the sun gear 8 serves as a reaction element and the ring gear 10 serves as an output element. Here, it is preferable to control a rotational speed of the first motor-generator 3 in such a manner that the engine 2 is operated in an optimally fuel efficient manner. In this situation, if a toque is applied to the first motor-generator 3 in a direction to reduce the rotational speed, the first motor-generator 3 serves as a generator to convert the power of the engine 2 partially into an electric power. During operating the first motor-generator 3 as a generator, the power generated by the engine 2 is consumed partially, and the remaining power of the engine 2 is delivered through the power distribution device 7. By contrast, if an output torque of the first motor-generator 3 is increased in a direction to increase a rotational speed thereof, the first motor-generator 3 serves as a motor. In this case, the output power of the first motor-generator 3 is added to the output power of the engine 2 and distributed through the power distribution device 7. It is to be noted that the output torque of the first motor-generator 3 is changed depending on a current applied thereto.

Thus, the output power of the engine 2 is distributed through the power distribution device 7 while changing a rotational speed. The second motor-generator 4 is adapted to generate torque in accordance with a current applied thereto in such a manner as to adjust the output power of the engine 2. To this end, an output shaft 19 of the second motor-generator 4 is connected to a reduction gear 20 meshing with the driven gear 14. Accordingly, when the first motor-generator 3 is operated as a motor, the second motor-generator 4 is operated as a generator to convert the power generated by the first motor-generator 3 into an electric power. By contrast, when the first motor-generator 3 is operated as a generator, the second motor-generator 4 is operated as a motor to compensate a reduction in power resulting from operating the first motor-generator 3 as a generator. In the following explanation, an operating mode in which the vehicle 1 is powered by the engine 2 will be called as the "HV mode (i.e., the hybrid mode)". The first motor-generator 3 and the second motor-generator 4 are not only connected individually to a battery 21 but also connected to each other so that the electric power generated by any of the motor-generator 3 and 4 can be supplied directly to the other the motor-generator 3 or 4 without passing through the battery 21.

The vehicle 1 may also be propelled under EV mode (i.e., electric vehicle mode) in which the vehicle 1 is powered by at least any one of the first motor-generator 3 and the second motor-generator 4 while stopping the engine 1. Specifically, the EV mode may be selected from single-motor mode and dual-motor mode. Under the single-motor mode, an electric power is supplied from the battery to the second motor-generator 4 to power the vehicle 1 only by the second motor-generator 4, and hence fuel supply to the engine 2 and power supply to the first motor-generator 3 can be stopped. Since a torque required to rotate the engine 2 is larger than that required to rotate the first motor-generator 3, the engine 2 stops and the first motor-generator 3 idles during propulsion under the single-motor mode.

As described, since the vehicle 1 is powered only by the second motor-generator 4 under the single-motor mode, an available driving force of the single-motor mode is smaller than those of the other operating modes. If a driving force larger than the available driving force of the single-motor mode, the operating mode may be shifted to the dual-motor mode in which the driving wheels 6 are rotated by powers from the first motor-generator 3 and the second motor-generator 4. Under the dual-motor mode, a brake device 22 is brought into engagement to halt a rotation of the output shaft 5 of the engine 2 during delivering power of the first motor-generator 3 to the driving wheels 6 so that the carrier 11 is allowed to serve as a reaction element and the sun gear 8 is allowed to serve as an input element. For example, a frictional engagement device, a dog clutch etc. may be used as the brake device 22. In addition, a one-way clutch adapted to prevent an inverse rotation of the output shaft 5 of the engine 2 may also be used as the brake device 22.

A control mode of the hybrid vehicle 1 may be selected from Charge Depleting mode (to be abbreviated as the "CD mode" hereinafter) as a fuel saving mode in which the EV mode is selected on a priority basis to propel the vehicle 1 by the electric power stored in the battery 21, and Charge Sustaining mode (to be abbreviated as the "CS mode" hereinafter) as an electricity saving mode in which the HV mode is selected on a priority basis to propel the vehicle 1 while saving the power consumption of the battery 21. In order to manually switch the control mode between the CD mode and the CS mode, the vehicle 1 is provided with a switch 23. Those control modes and the operating modes are selected based on an operating point representing a running condition of the vehicle 1 governed by a required driving force and a vehicle speed. The control mode currently selected is indicated on an instrument panel 24 as a notifying device to notify the driver of the current control mode. Instead, a voice system adapted to notify the driver of the current control mode by a voice message may also be employed as the notifying device.

Figure 6:
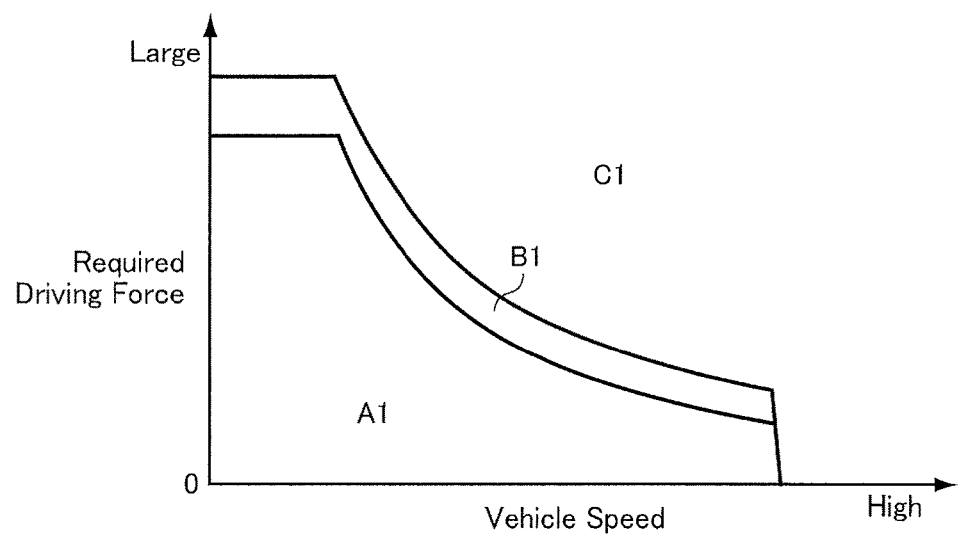
FIG. 6 is a map for selecting the operating mode under the CD mode.

Turning to FIG. 6, there is shown a map for selecting the operating mode under the CD mode. In FIG. 6, the horizontal axis represents a vehicle speed, and the vertical axis represents a required driving force. If the vehicle speed is low and the required driving force is small and hence an operating point of the vehicle 1 falls within a first region A1, the single-motor mode is selected. A boundary defining the first region A1 is determined based on a maximum output power of the second motor-generator 4 governed by an output voltage of the battery 21 changed depending on a state of charge (to be abbreviated as the "SOC" hereinafter). Therefore, the boundary defining the first region A1 may be altered depending on the SOC of the battery 21.

Under the CD mode, if the required driving force is greater than the upper limit of that of the first region A1 and hence the operating point of the vehicle 1 falls within a second region B1, the dual-motor mode is selected. Accordingly, an upper limit value of the required driving force of the second region B1 is determined based on a total maximum output power of the first motor-generator 3 and the second motor-generator 4. If the required driving force is greater than the upper limit of that of the second region B1 or the vehicle speed is higher than an upper limit of that of the second region B1 and hence the operating point of the vehicle 1 falls within a third region C1, the HV mode is selected. Thus, under the CD mode, the operating mode of the vehicle 1 is shifted from the single-motor mode, the dual-motor mode and the HV mode sequentially with increase in the required driving force and the vehicle speed.

Figure 7:
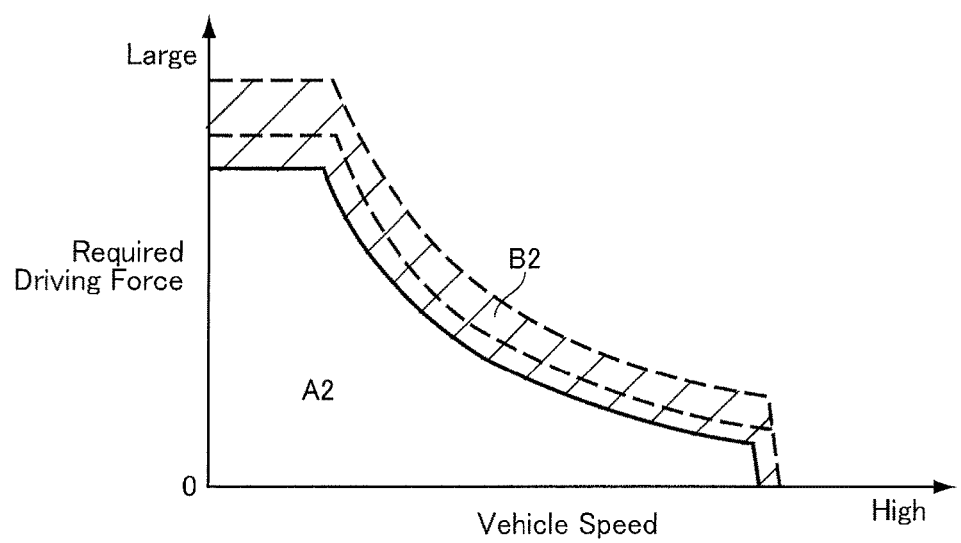
FIG. 7 is a map for selecting the operating mode under the CS mode.

By contrast, under the CS mode, the operating mode of the vehicle 1 is shifted from the single-motor mode to the HV mode. A map for selecting the operating mode under the CS mode is shown in FIG. 7. In FIG. 7, the horizontal axis also represents the vehicle speed, and the vertical axis also represents the required driving force. In addition, in FIG. 7, the boundary defining the first region A1 and the boundary defining the second region B1 of the CD mode are individually indicated by dashed lines.

Under the CD mode, if the vehicle speed is low and the required driving force is small and hence an operating point of the vehicle 1 falls within a fourth region A2, the single-motor mode is selected. If the required driving force is greater than the upper limit of that of the fourth region A2, or if the vehicle speed is higher than the upper limit of that of the fourth region A2, the HV mode is selected. The upper limit values of the required driving force and the vehicle speed within the fourth region A2 are determined in such a manner that a reduction in the driving force will not be caused by starting the engine 2 when shifting the operating mode to the HV mode. In the hybrid vehicle 1, the engine 2 is started by the first motor-generator 3, and a reaction force resulting from cranking of the engine 2 is compensated by increasing an output power of the second motor-generator 4. Specifically, the boundary defining the fourth region A2 is determined by subtracting the reaction force resulting from starting the engine 2 from the maximum output power of the second motor-generator 4. That is, the upper limit values of the required driving force and the vehicle speed within the fourth region A2 are smaller than those within the first region A1. As described, the output voltage of the battery 21 is changed depending on the SOC thereof. Therefore, the boundary defining the fourth region A2 may also be altered depending on the SOC of the battery 21.

A shifting operation of the operating mode is carried out by an electronic control unit (to be abbreviated as the "ECU" hereinafter) 25 as the claimed controller. To the ECU 25, detection signals are transmitted from an accelerator opening sensor, a vehicle speed sensor, resolvers for detecting rotational speeds of the motor-generators 3 and 4, an SOC sensor 26 for detecting an SOC level of the battery 21 and so on. In addition, a selection signal of the control mode is also transmitted to the ECU 25 from the switch 23, and the maps shown in FIGS. 6 and 7 as well as various kinds of arithmetic expressions are preinstalled in the ECU 25. The ECU 25 sends command signals to the engine 2, the motor-generators 3 and 4, the brake device 22, the instrument panel 24 and so on based on the above-mentioned signals and the preinstalled data.

During propulsion under the CD mode, if the operating point of the vehicle 1 falls within a fifth region B2 as a hatched region in FIG. 7 between the boundary defining the fourth region A2 of the CS mode and the boundary defining the second region B1 of the CD mode, this means that the driver intends to shift the control mode to the CS mode. In response to such driver's intension, the operating mode is shifted from the dual-motor mode to the HV mode and hence the engine 2 is started. As described, when the engine 2 is started by the first motor-generator 3, reduction in the driving force is caused in the total amount of the reaction force applied to the driving wheels 6 and the driving force generated by the first motor-generator 3. For this reason, a temporal drop in the driving force may be caused if the control mode is switched under the condition that the operating point of the vehicle 1 falls within the fifth region B2.

Figure 1:
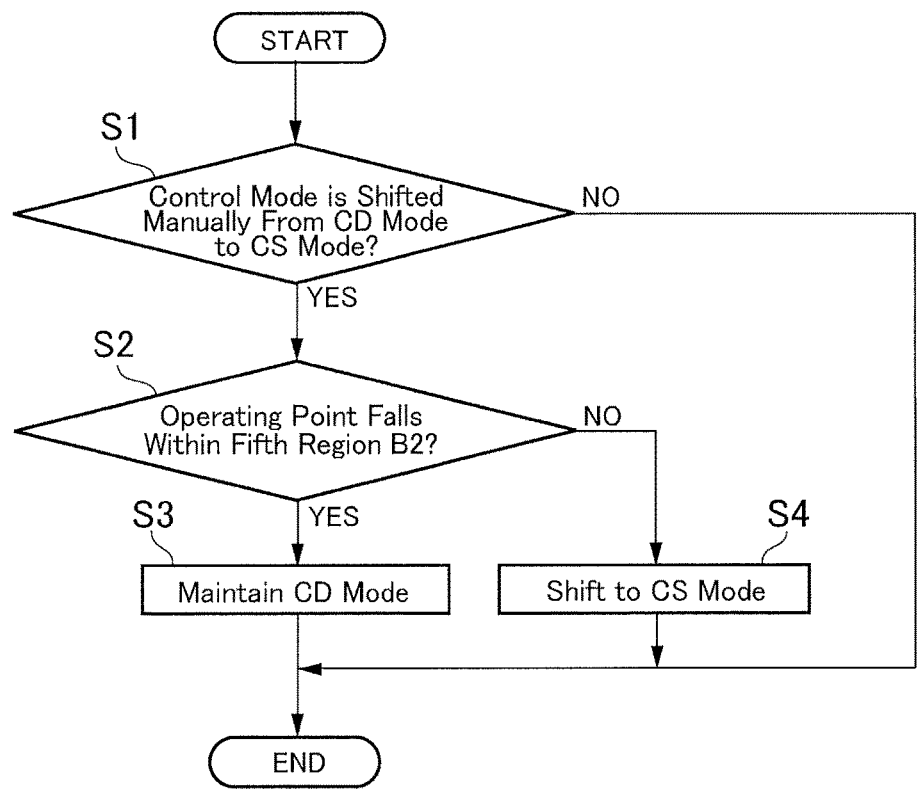
FIG. 1 is a flowchart showing an example of the control carried out by the control system according to the preferred example.

In order to prevent such temporal drop in the driving force, the ECU 25 is configured to carry out the following controls. Turning to FIG. 1, there is shown an example of selection of the control mode without causing such temporal drop in the driving force. The routine shown in FIG. 1 is carried out during propulsion under the CD mode while stopping the engine 2, and repeated at predetermined interval. In the routine shown in FIG. 1, first of all, an execution of manual shifting operation from the CD mode to the CS mode by the driver is determined at step S1. Such determination at step S1 may be made based on the incident signal from the switch 23. If the control mode is not shifted to the CS mode so that the answer of step S1 is NO, the routine is terminated without carrying out any specific control.

By contrast, if the control mode is shifted from the CD mode to the CS mode so that the answer of step S1 is YES, it is determined whether or not the operating point of the vehicle 1 falls within the fifth region B2 at step S2. Such determination at step S2 may be made based on the incident signals from the accelerator opening sensor and the vehicle speed sensor while with reference to the maps shown in FIGS. 6 and 7. If the operating point of the vehicle 1 falls within the fifth region B2 so that the answer of step S2 is YES, the control mode is maintained to the CD mode at step S3, and then the routine is returned. In this case, if the control mode is shifted to the CS mode, shocks may be caused by the reduction in the driving force resulting from starting the engine 2 and hence the control mode is maintained to the CD mode.

By contrast, if the operating point of the vehicle 1 falls out of the fifth region B2 so that the answer of step S2 is NO, the control mode is shifted to the CS mode at step S4, and then the routine is terminated. In this case, since the operating point of the vehicle 1 falls within the fourth region A2 even if the control mode is shifted to the CS mode, the control mode is allowed to be shifted to the CS mode without starting the engine 2. That is, the operating mode of the vehicle 1 is not shifted to the HV mode at the timing when the control mode is shifted to the CS mode at step S4. Then, the engine 2 is started when the vehicle speed or the required driving force exceeds the boundary of the fourth region A2.

Figure 2:
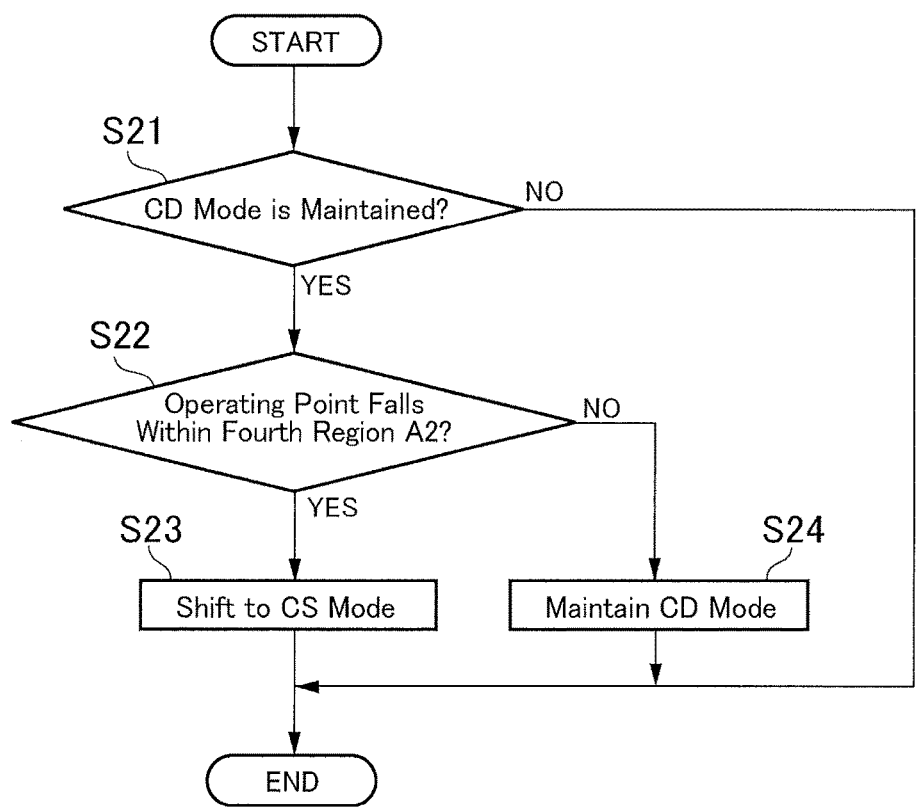
FIG. 2 is a flowchart showing an example of the control for shifting the control mode from the CD mode to the CS mode.

In case the CD mode is maintained at step S3, the control mode will be shifted to the CS mode when the vehicle speed or the required driving force is reduced so that the operating point enters into the fourth region A2. An example of such control is shown in FIG. 2. The routine shown in FIG. 2 is started upon execution of a manual operation of the switch 23 to shift the control mode from the CD mode to the CS mode, and repeated until the control mode is shifted to the CS mode. In the routine shown in FIG. 1, first of all, it is determined step S21 whether or not the CD mode is maintained. Such determination at step S21 may be made by confirming a fact that the vehicle 1 is currently controlled under the CD mode while confirming an execution of the manual operation of the switch 23 to shift the CS mode. If the control mode has already been shifted to the CS mode so that the answer of step S21 is NO, the routine is terminated without carrying out any specific control.

By contrast, if the control mode is still maintained to the CD mode so that the answer of step S21 is YES, it is determined at step S22 whether or not the operating point of the vehicle 1 falls within the fourth region A2. Such determination at step S22 may also be made based on the incident signals from the accelerator opening sensor and the vehicle speed sensor while with reference to the maps shown in FIGS. 6 and 7. If the operating point of the vehicle 1 falls within the fourth region A2 so that the answer of step S22 is YES, the control mode is shifted to the CS mode at step S23, and then the routine is terminated.

By contrast, if the operating point of the vehicle 1 falls out of the fourth region A2 so that the answer of step S22 is NO, the control mode is maintained to the CD mode at step S24, and then the routine is returned. In this case, the control mode has not yet been shifted to the CS mode and hence the routine is repeated after a lapse of predetermined period until the control mode is shifted to the CS mode. Thus, when the control mode is shifted manually from the CD mode to the CS mode and consequently the operating mode is shifted from the EV mode to the HV mode, startup of the engine 2 is delayed until the operating point of the vehicle 1 enters into the fourth region A2.

Here, it is to be noted that the routine shown in FIG. 1 and the routine shown in FIG. 2 may be executed integrally by repeating the determination at step S2 of the routine shown in FIG. 1 until the control mode is maintained to the CD mode.

Figure 3:
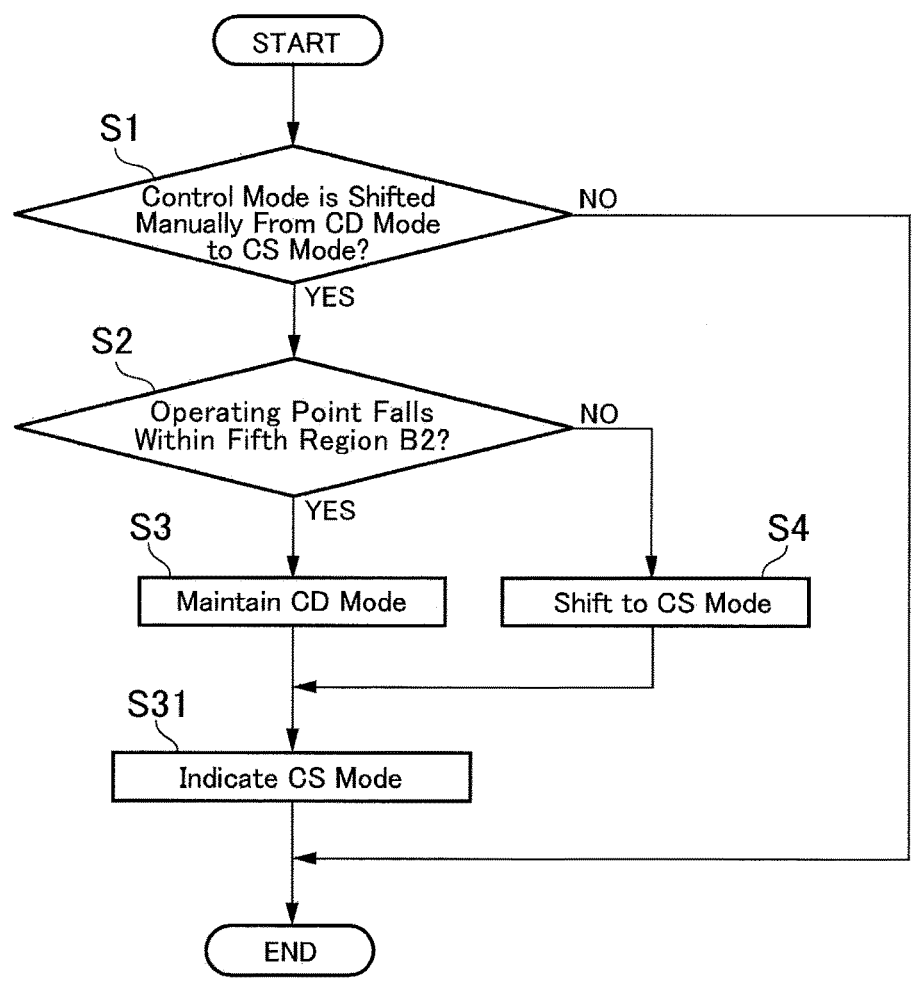
FIG. 3 is a flowchart showing an example of a switching control of indication on an indication panel.

In case the control mode is maintained to the CD mode in spite of the fact that the driver operated the switch 23 to shift the control to the CS mode, the driver may be confused if the instrument panel 24 keeps indicating the CD mode. In order to prevent such confusion of the driver, as shown in FIG. 3, the ECU 25 is further configured to switch the indication of the instrument panel 24 in response to the switching operation of the switch 23 executed by the driver. In the following explanation, detailed explanation for the steps in common with those in FIG. 1 will be omitted. In the routine shown in FIG. 3, after the control mode is maintained to the CD mode at step S3 or shifted to the CS mode at step S4, a command to indicate the CS mode is sent to the instrument panel 24 at step S31. Then, the routine is terminated.

Thus, according to the foregoing embodiments, the CD mode may be maintained if the reduction in the driving force is expected to be caused by shifting the control mode to the CD mode. In this case, the SOC level of the battery 21 may be lowered excessively as a result of propelling the vehicle by the electric power stored in the battery 21. In addition, in the dual-motor mode, a rotational speed of each pinion gear 9 may be raised excessively and hence the pinion gear 9 may be damaged by a temperature rise thereof.

Figure 4:
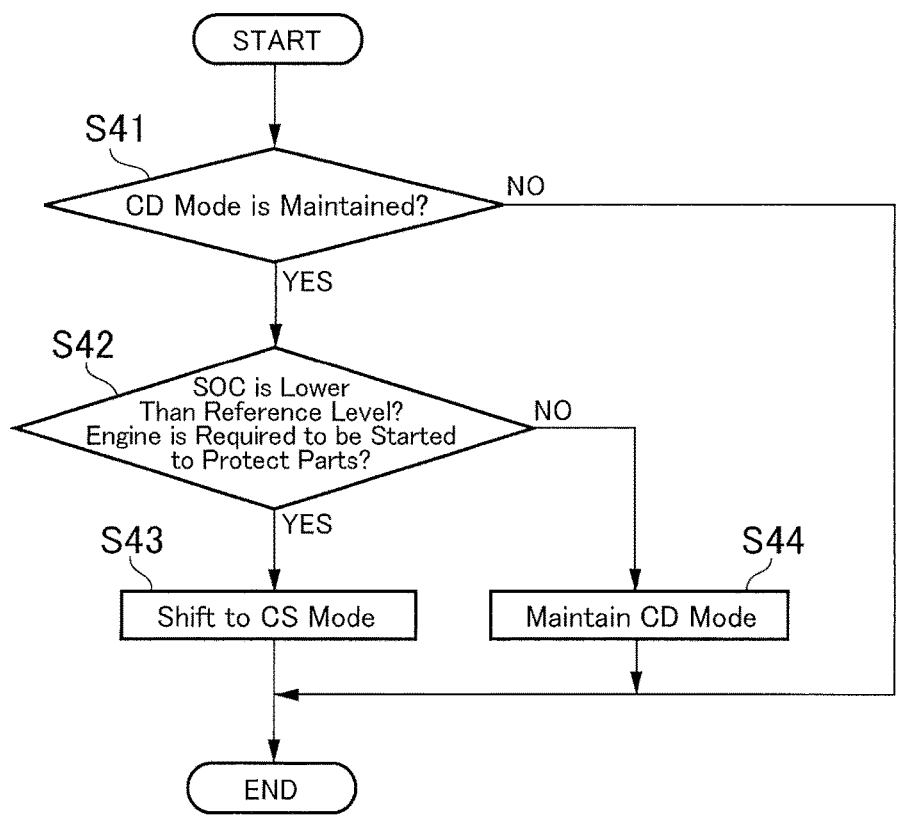
FIG. 4 is a flowchart showing an example of the control for shifting the control mode to prevent an excessive reduction in the SOC and to limit damage on the parts.

In order to prevent the above-explained disadvantages, as shown in FIG. 4, the ECU 25 is further configured to shift the control mode from the CD mode to the CS mode even if the operating point of the vehicle 1 falls within the fifth region B2. The routine shown in FIG. 4 is started upon execution of a manual operation of the switch 23 to shift the control mode from the CD mode to the CS mode, and repeated until the control mode is shifted to the CS mode. In the routine shown in FIG. 4, first of all, it is determined step S41 whether or not the CD mode is maintained. Such determination at step S41 may also be made by confirming a fact that the vehicle 1 is currently controlled under the CD mode while confirming an execution of the manual operation of the switch 23 to shift the CS mode. If the control mode has already been shifted to the CS mode so that the answer of step S41 is NO, the routine is terminated without carrying out any specific control.

By contrast, if the control mode is still maintained to the CD mode so that the answer of step S41 is YES, it is determined at step S42 whether or not the SOC level of the battery 21 is lower than a predetermined reference level and hence a startup of the engine 2 is demanded to protect gears or the like. To this end, the reference level of the SOC may be determined in such a manner as to limit damage on the battery 21, or to ensure a required electric power to start the engine 2. Such determination to start the engine 2 for the purpose of protection of the parts may also be made based on duration of the dual-motor mode, temperatures of the parts and so on.

If the startup of the engine 2 is demanded so that the answer of step S42 is YES, the control mode is shifted to the CS mode at step S43, and then the routine is terminated. As explained in the foregoing embodiments, the operating point of the vehicle 1 stays within the fifth region B2 during maintaining the CD mode. In this situation, the engine 2 is started when the control mode is shifted to the CS mode. By contrast, if the startup of the engine 2 is not demanded so that the answer of step S42 is NO, the control mode is maintained to the CD mode at step S44, and then the routine is returned. In this case, the control mode has not yet been shifted to the CS mode and hence the routine is repeated after a lapse of predetermined period until the control mode is shifted to the CS mode.

As has been explained, according to the preferred embodiments, shocks resulting from reduction in the driving force caused by starting the engine 2 can be prevented by maintaining the CD mode to delay the startup of the engine 2 when shifting the control mode in response to the manual operation of the driver. In case of thus maintaining the control mode to the CD mode, the driver can be prevented from being confused by indicating the CS mode on the instrument panel 24. In addition, the control mode is allowed to be shifted from the CD mode to the CS mode to maintain the SOC level of the battery and to protect the gears or the like by terminating the dual-motor mode.

Although the above exemplary embodiments of the present application have been described, it will be understood by those skilled in the art that the present application should not be limited to the described exemplary embodiments, and various changes and modifications can be made within the spirit and scope of the present application. That is, the control system according to the preferred embodiments may be applied to any kind of hybrid vehicles irrespective of the number of motors as long as the control mode can be selected manually.

What is claimed is:

1. A control system for a hybrid vehicle having an engine and at least one motor adapted not only to generate a driving force but also to start the engine, comprising:
a controller that starts the engine by the motor upon satisfaction of a predetermined running condition of the vehicle governed at least by a required driving force;
wherein the controller is configured to
switch an operating mode of the vehicle between HV mode in which the vehicle is powered by the engine and EV mode in which the vehicle is powered by said motor while stopping the engine in response to a manual switching operation, and
delay a startup of the engine until satisfaction of said predetermined running condition, if the manual switching operation is executed to shift from the EV mode to the HV mode under a condition that the running condition falls within a region where both of the HV mode and the EV mode are selectable,
wherein the controller is further configured to switch a control mode of the vehicle between a fuel saving mode in which the EV mode is selected on a priority basis and an electricity saving mode in which the HV mode is selected on a priority basis, in response to a manual switching operation, and
wherein the manual switching operation includes a manual operation to shift the control mode from the fuel saving mode to the electricity saving mode under a condition that the running condition falls within a region where the EV mode is selected under the fuel saving mode and the HV mode is selected under the electricity saving mode.

2. The control system for a hybrid vehicle as claimed in claim 1, further comprising:

a notifying device that notify a driver of the current operating mode; and
wherein the controller is further configured to send a command to the notifying device to indicate the HV mode as the current operating mode in response to an execution of the manual switching operation from the EV mode to the HV mode.

3. The control system for a hybrid vehicle as claimed in claim 1, wherein the controller is further configured to execute the startup of the engine upon satisfaction of another condition to start the engine other than the running condition, while the manual switching operation from the EV mode to the HV mode is executed but the startup of the engine is being delayed.

4. A control system for a hybrid vehicle having an engine and at least one motor adapted not only to generate a driving force but also to start the engine, comprising:
a controller that starts the engine by the motor upon satisfaction of a predetermined running condition of the vehicle governed at least by a required driving force;
wherein the controller is configured to
switch an operating mode of the vehicle between HV mode in which the vehicle is powered by the engine and EV mode in which the vehicle is powered by said motor while stopping the engine in response to a manual switching operation, and
delay a startup of the engine until satisfaction of said predetermined running condition, if the manual switching operation is executed to shift from the EV mode to the HV mode under a condition that the running condition falls within a region where both of the HV mode and the EV mode are selectable,
wherein the hybrid vehicle comprises:
a first motor connected to the engine;
a second motor connected to driving wheels;
a power distribution device adapted to perform a differential action among a first rotary element connected to the engine, a second rotary element connected to the first motor, and a third rotary element connected to the driving wheels; and
a brake device that selectively halts rotation of the first rotary element; and
wherein the EV mode includes:
a single-motor mode in which the vehicle is powered by the second motor; and
a dual-motor mode in which the vehicle is powered by both of the first motor and the second motor while halting a rotation of the first rotary element by the brake device.

5. The control system for a hybrid vehicle as claimed in claim 1, wherein the predetermined running condition includes a fact that the required driving force is reduced to be smaller than the driving force calculated by subtracting a reduction in the driving force resulting from starting the engine from a maximum output power of the second motor-generator under the EV mode.

6. The control system for a hybrid vehicle as claimed in claim 4, further comprising:
a notifying device that notify a driver of the current operating mode; and
wherein the controller is further configured to send a command to the notifying device to indicate the HV mode as the current operating mode in response to an execution of the manual switching operation from the EV mode to the HV mode.

7. The control system for a hybrid vehicle as claimed in claim 4, wherein the controller is further configured to execute the startup of the engine upon satisfaction of another condition to start the engine other than the running condition, while the manual switching operation from the EV mode to the HV mode is executed but the startup of the engine is being delayed.

8. The control system for a hybrid vehicle as claimed in claim 4, wherein the predetermined running condition includes a fact that the required driving force is reduced to be smaller than the driving force calculated by subtracting a reduction in the driving force resulting from starting the engine from a maximum output power of the second motor-generator under the EV mode.

* * * * *